(No Model.)
P. HOOGERZEIL, Jr. & G. F. HINKLEY.
STOVE OVEN.
No. 403,938. Patented May 28, 1889.
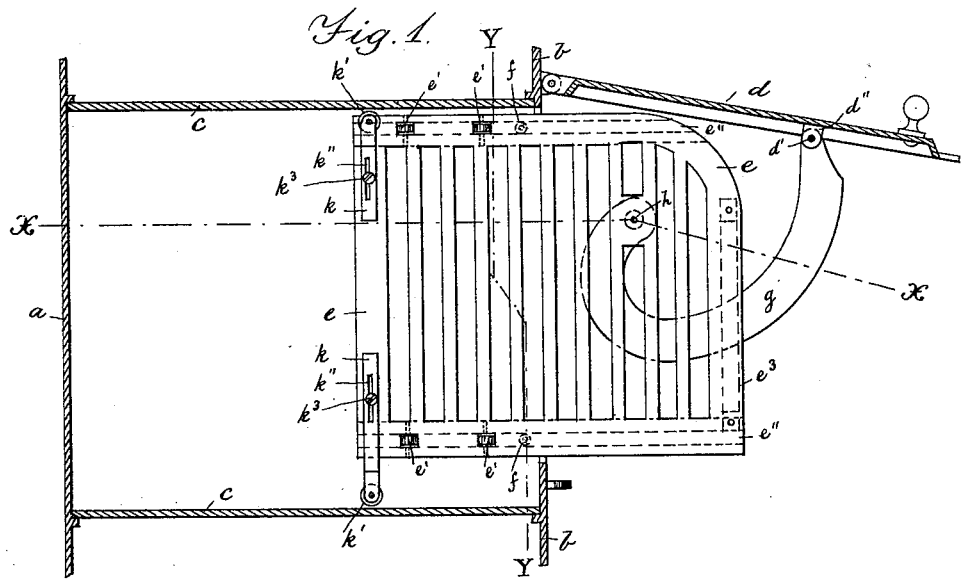
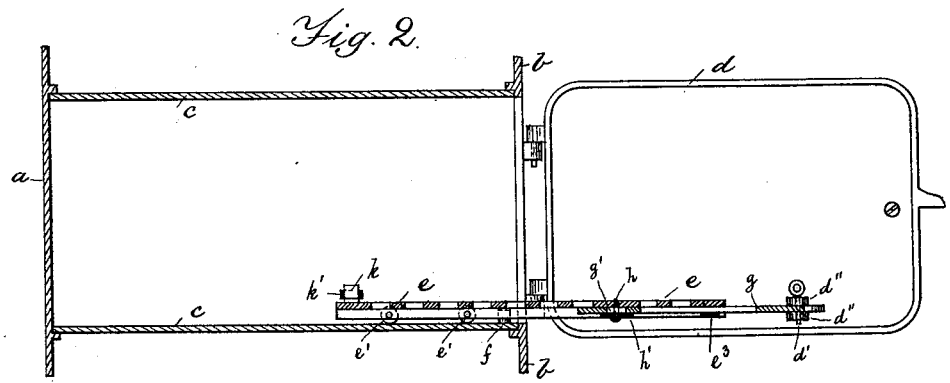
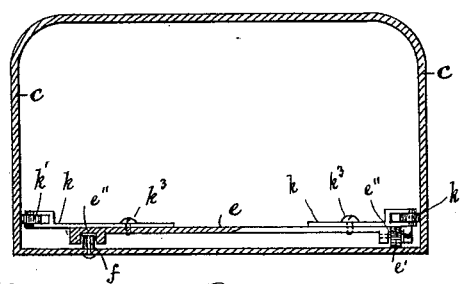
Witnesses.
Geo. W. White
C. N. Goodrich
Inventors.
Peter Hoogerzeil Jnr and George F. Hinkley
by Alban Andrén, their atty.

UNITED STATES PATENT OFFICE.

PETER HOOGERZEIL, JR., AND GEORGE F. HINKLEY, OF BEVERLY, MASSACHUSETTS.

STOVE-OVEN.

SPECIFICATION forming part of Letters Patent No. 403,938, dated May 28, 1889.

Application filed February 23, 1889. Serial No. 300,944. (No model.)

*To all whom it may concern:*

Be it known that we, PETER HOOGERZEIL, Jr., and GEORGE F. HINKLEY, citizens of the United States, and both residents of Beverly, in the county of Essex and State of Massachusetts, have jointly invented new and useful Improvements in Stove-Ovens, of which the following, taken in connection with the accompanying drawings, is a specification.

This invention relates to improvements in stove-ovens; and it consists, in combination with an oven and its door, of a movable plate or grating suitably connected to the door in such a manner that said plate or grating may be automatically drawn out when the door is opened for the purpose of enabling the food supported in a suitable vessel on said plate or grating to be examined from time to time—for instance, for the purpose of basting meats and for other similar purposes—without the need of pulling out the pan or dish in which the meat or other food is contained.

The invention is carried out as follows, reference being had to the accompanying drawings, wherein—

Figure 1 represents a plan view showing the door swung open and the grating drawn out, and showing the oven and its door in section. Fig. 2 represents a section on the line X X, shown in Fig. 1; and Fig. 3 represents a cross-section on the line Y Y, shown in Fig. 2.

Similar letters refer to similar parts wherever they occur on the different parts of the drawings.

$a$ represents the back, and $b$ represents the front, of a cooking-stove, as usual. $c$ represents the oven secured in a suitable manner to such back and front of the stove, as usual.

$d$ represents the oven-door hinged, as usual, to the stove front or oven.

Within the oven is located the perforated plate or grating $e$, preferably provided on its under side with anti-friction rollers $e'$ $e'$ $e'$ $e'$, adapted to roll on the bottom of the oven $c$ when said grating is being moved out or in by the opening or closing of the door. For the purpose of guiding said plate or grating properly without much frictional resistance while it is being moved out or into the oven, we make on its under side a pair of longitudinal grooves, $e''$ $e''$, adapted to receive the pins or pins and rolls $f f$ on the interior of the bottom of the oven $c$, as shown in the drawings.

The oven-door and the adjustable plate or grating are connected together as follows: $g$ is a curved or cam-shaped metal plate or bar, the outer end of which is pivoted, preferably by means of a removable pin, $d'$, to a bracket or ears, $d''$ $d''$, secured to or forming a part of the door $d$, as shown in Figs. 1 and 2. The inner end of said curved metal plate $g$ is pivoted to the grating $e$ by means of a screw or pin, $h$, attached to said grating and passing loosely through an enlarged perforation, $g'$, in the inner end of said curved plate $g$, as shown in Fig. 2, so as to permit the latter to adjust itself automatically relative to the pin $h$ during the operation of the device, so as to enable it to be easily operated without binding or unnecessary friction. A washer, $h'$, somewhat larger than the perforation $g'$ in the inner end of the curved plate $g$, is placed on the pin or screw $h$ below the said curved plate, as shown in Fig. 2, so as to prevent the latter from dropping off the head of said pin or screw.

A guide-bar, $e^3$, is secured to the under side of the grating $e$, at or near its forward end, as shown in Figs. 1 and 2, between which and the under side of the grating $e$ the curved metal bar or plate $g$ is guided during the operation of the device.

In a device of this kind it is essential that the inner end of the grating $e$ should be properly guided, and for this purpose we secure in an adjustable manner to the inner end of said grating the metal guides $k$ $k$, having the anti-frictional rollers $k'$ $k'$ journaled in their outer ends, which rollers are adapted to roll against opposite sides of the interior of the oven $c$, as shown in the drawings, thus causing the said grate $e$ to be properly guided without much friction as it is being moved in or out of the oven. The said guides $k$ $k$ are preferably provided with slots $k''$ $k''$, adapted to receive the fastening-screws $k^3$ $k^3$, that are screwed into perforations in the grating $e$, as shown; but this is not essential, as the said guides may be laterally adjustable relative to the grating $e$ and the interior portion of the sides of the oven in any other suitable or equivalent manner.

It will thus be seen that by opening the door $d$ the grating supporting the food that is being cooked will be automatically pulled outward, as shown in Figs. 1 and 2, and as the door is being shut the said grating will be automatically pushed inward into the oven, for the purpose described. The curved bar or plate $g$, being connected to the door as described, also serves as a rest and support for the outer end of the grating $e$, so as to prevent the latter from tipping over when moved outward, as shown in Figs. 1 and 2.

In heating liquids or food of a semi-liquid nature liable to spill or overflow by the motion of the grating it may be desirable to keep the said grating stationary within the oven, and this can be done simply by disconnecting the pin $d'$ from the door $d$ and the bar or plate $g$ and pushing the said grating and its curved bar $g$ entirely into the oven, when the door $d$ may be manipulated without imparting motion to the grating, or the latter may be removed from the oven whenever so desired.

We have shown in the drawings the invention as applied to an oven; but it is evident that it is equally well adapted for refrigerators, boxes, or receptacles of any kind in which it may be desirable to automatically manipulate the shelves or plates by the opening and closing motion of the door.

Having thus fully described the nature, construction, and operation of our invention, we wish to secure by Letters Patent, and claim—

The oven or box $c$ and its hinged door $d$, and the movable plate or grating $e$, connected to said door, as described, and having longitudinal grooves $e''$ $e''$, in combination with the anti-friction supporting-rollers $e'$ $e'$, the adjustable side rollers, $k'$ $k'$, and pins or pins and rolls $f f$, all arranged and combined substantially in a manner and for the purpose as specified.

In testimony whereof we have signed our names to this specification, in the presence of two subscribing witnesses, on this 19th day of February, A. D. 1889.

PETER HOOGERZEIL, Jr.
GEORGE F. HINKLEY.

Witnesses:
ALBAN ANDRÉN,
CARL A. ANDRÉN.